US006804092B1

(12) United States Patent
Magnier

(10) Patent No.: US 6,804,092 B1
(45) Date of Patent: Oct. 12, 2004

(54) DEVICE FOR PREVENTION AGAINST EXPLOSION OF ELECTRICAL TRANSFORMERS

(76) Inventor: Philippe Magnier, 68, rue de Poissy, 8-78100 Saint-Germain-en-Laye (FR)

( * ) Notice: Subject to any disclaimer, the term of this patent is extended or adjusted under 35 U.S.C. 154(b) by 0 days.

(21) Appl. No.: 09/937,362

(22) PCT Filed: Mar. 17, 2000

(86) PCT No.: PCT/FR00/00666

§ 371 (c)(1),
(2), (4) Date: Dec. 17, 2001

(87) PCT Pub. No.: WO00/57438

PCT Pub. Date: Sep. 28, 2000

(30) Foreign Application Priority Data

Mar. 22, 1999 (FR) .......................................... 99 03534

(51) Int. Cl.[7] .................................................. H02H 7/04
(52) U.S. Cl. .......................................... 361/38; 361/37
(58) Field of Search ............................ 361/38, 37, 93, 361/103, 115

(56) References Cited

U.S. PATENT DOCUMENTS 4,117,525 A * 9/1978 Moore ......................... 361/37
5,781,976 A * 7/1998 Stuhlbacher et al. .......... 29/6.1
5,946,171 A 8/1999 Magnier ...................... 361/37

FOREIGN PATENT DOCUMENTS

FR WO 97/12379 4/1997

OTHER PUBLICATIONS

Patent Abstracts of Japan, Publication No. 57007909, Publication Date Jan. 16, 1982.

* cited by examiner

*Primary Examiner*—Lawrence Luk
(74) *Attorney, Agent, or Firm*—Meyertons, Hood, Kivlin, Kowert & Goetzel, P.C.

(57) ABSTRACT

Device for prevention against explosion of an electrical transformer comprising an enclosure filled with combustible coolant, and a means for decompressing the enclosure of the transformer. The decompression means comprises a rupture element 1 with integrated explosion detector provided with a retention part 4 including first zones which have a reduced thickness in comparison with the rest of the retention part 4 and are capable of tearing without fragmenting when the said element 1 ruptures, and second zones which have reduced thickness in comparison with the rest of the retention part 4 and are capable of folding without tearing when the said element 1 ruptures. The said rupture element 1 is capable of breaking when the pressure inside the enclosure exceeds a predetermined ceiling.

The signal from an explosion detector integrated with the rupture disc triggers a cooling system and prevents oxygen from coming into contact with the explosive gases generated by the electric arc in contact with the oil.

18 Claims, 5 Drawing Sheets

DEVICE FOR PREVENTION AGAINST EXPLOSION OF ELECTRICAL TRANSFORMERS

The present invention relates to the field of the prevention against explosion of electrical transformers cooled by a large volume of combustible fluid.

Electrical transformers exhibit losses both in the windings and in the core, for which reason the heat produced needs to be dissipated. High-power transformers are thus generally cooled using a fluid such as oil. The oils used are dielectric and can ignite above a temperature of the order of 140° C. Since transformers are very expensive elements, particular attention must be paid to protecting them.

An insulation fault first generates a strong electric arc which prompts action by the electrical protection systems, which trip the supply relay of the transformer (circuit breaker). The electric arc also causes consequent dissipation of energy, which generates release of gas from decomposition of the dielectric oil, in particular hydrogen and acetylene.

After the gas has been released, the pressure inside the enclosure of the transformer increases very rapidly, whence an often very violent deflagration. The deflagration results in extensive tearing of the mechanical connections in the enclosure (bolts, welds) of the transformer, which brings the said gases into contact with the oxygen in the surrounding air. Since acetylene can spontaneously ignite in the presence of oxygen, combustion immediately starts and causes the fire to spread to other on-site equipment which may also contain large quantities of combustible products.

Explosions are due to short-circuits caused by overloads, voltage surges, progressive deterioration of the insulation, and insufficient oil level, the appearance of water or moisture or the failure of an insulating component.

Fire protection systems for electrical transformers are known in the prior art, and these are actuated by combustion or fire detectors. However, these systems are implemented with a significant time lag, when the oil of the transformer is already burning. It then being necessary to make to with limiting the combustion to the equipment in question, and to prevent the fire from spreading to the neighbouring plant.

In order to slow down the decomposition of the dielectric fluid due to an electric arc, silicone oils may be used instead of conventional mineral oils. However, explosion of the enclosure of the transformer due to the increase in the internal pressure is delayed only by an extremely short time, of the order of a few milliseconds. This length of time does make it possible to engage means which can prevent the explosion.

The document WO-A-97/12379 discloses a method for prevention against explosion and fire in an electrical transformer provided with an enclosure filled with combustible coolant, by detecting a break in the electrical insulation of the transformer using a pressure sensor, depressurizing the coolant contained in the enclosure, using a valve, and cooling the hot parts of the coolant by injecting a pressurized inert gas into the bottom of the enclosure in order to stir the said coolant and prevent the oxygen from entering the enclosure of the transformer. This method is satisfactory and makes it possible to prevent the enclosure of the transformer from exploding.

The object of the present invention is to provide an improved device allowing extremely rapid decompression of the enclosure in order to further increase the probability of safeguarding the integrity of the transformer, of the on-load tap changers and of the feed-throughs.

The device for prevention against explosion according to the invention is intended for an electrical transformer comprising an enclosure filled with combustible coolant, and a means for decompressing the enclosure of the transformer. The decompression means comprises a rupture element provided with a retention part including first zones which have a reduced thickness in comparison with the rest of the retention part and are capable of tearing without fragmenting when the said element ruptures, and second zones which have reduced thickness in comparison with the rest of the retention part and are capable of folding without tearing when the said element ruptures. The said rupture element is capable of breaking when the pressure inside the enclosure exceeds a predetermined ceiling.

Preferably, the rupture element is provided with a sealing component which is arranged on the coolant side and is capable of closing off small-diameter holes formed in the retention part. The holes may form tear initiators and be adjacent to the first zones of reduced thickness.

In one embodiment of the invention, the sealing component is in the form of a lining on the retention part, the said lining being preferably based on polytetrafluoroethylene.

Preferably, the retention part has a domed shape with convexity outwards, on the opposite side from the coolant.

In one embodiment of the invention, the retention part is metallic, made of stainless steel, aluminium or aluminium alloy.

Preferably, the device comprises a rupture-detection means integrated with the rupture element, which makes it possible to detect the pressure in the enclosure relative to the predetermined ceiling.

In one embodiment of the invention, the rupture-detection element comprises an electrical wire capable of breaking at the same time as the rupture element.

In one embodiment of the invention, the electrical wire is adhesively bonded on the rupture element.

Advantageously, the electrical wire is arranged on the opposite side of the retention part to the coolant.

In one embodiment of the invention, the electrical wire is covered with a protective film.

The invention also relates to a system for prevention against explosion of an electrical transformer comprising an enclosure filled with combustible coolant, and a means for decompressing the enclosure of the transformer. The system comprises a plurality of devices as described above, including one or more on a main enclosure containing the windings and one on each on-load tap changer.

The system may comprise at least one device as described above, on at least one electrical feed-through.

Simultaneously, the rupture element ruptures with the result that the enclosure becomes decompressed, and the wire ruptures with the result that an excessive and abnormal pressure is detected.

Of course, terms such as “on the fluid side” or “on the opposite side from the fluid” refer to the situation before rupture.

The device for prevention against explosion is designed for the main enclosure of a transformer, for the enclosure of the on-load tap changer or changers, and for the enclosure of the electrical feed-throughs, the latter enclosure also being referred to as the oil box. The purpose of the electrical feed-throughs is to isolate the main enclosure of a transformer from the high- and low-voltage lines to which the windings of the transformer are connected by means of the output rods. Each output rod is surrounded by an oil box containing a certain quantity of insulating fluid. The fluid for insulating the feed-throughs and/or oil boxes is an different oil from that of the transformer.

A nitrogen injection means may be provided which is connected to an upper part of an oil box and can be triggered when a fault is detected. Injecting nitrogen may promote the discharge of the fluid downstream of the rupture element. Injecting nitrogen may above all prevent air from entering the oil box, entry of air being capable of promoting combustion.

The device for prevention against explosion may be provided with a means for detecting the tripping of the supply relay of the transformer and with a control unit which receives the signals output by the sensor means of the transformer and which is capable of emitting control signals.

The device for prevention against explosion may comprise a means for cooling the hot parts of the fluid, by injecting inert gas into the bottom of the main enclosure, which means is controlled by a control signal from a control unit. The reason for this is that some parts of the coolant undergo heating which can cause it to ignite. Injecting an inert gas at the lower part of the enclosure causes stirring of the coolant, which equilibrates the temperature and reduces the release of gas.

The invention will be understood more clearly on studying the detailed description of some particular embodiments which are taken as entirely non-limiting examples and are illustrated by the appended drawings, in which:

FIG. 1*a* is a cross-sectional view of the prevention device according to the invention;

FIG. 1*b* is an enlarged partial view of FIG. 1*a;*

Figure 1A:
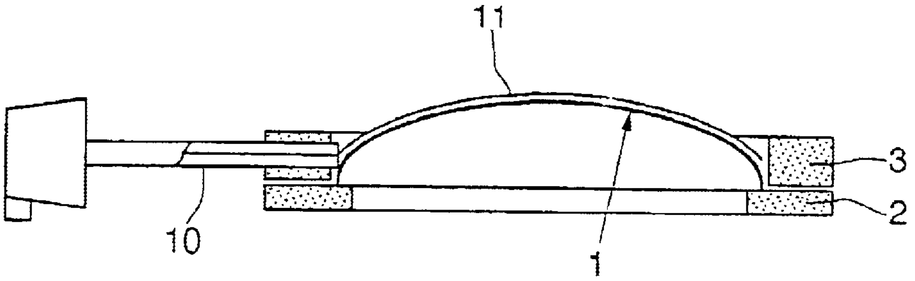
Figure 1B:
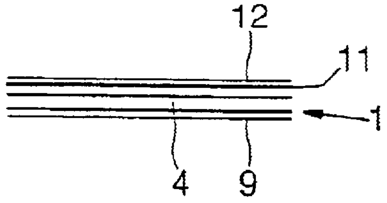
Figure 2:
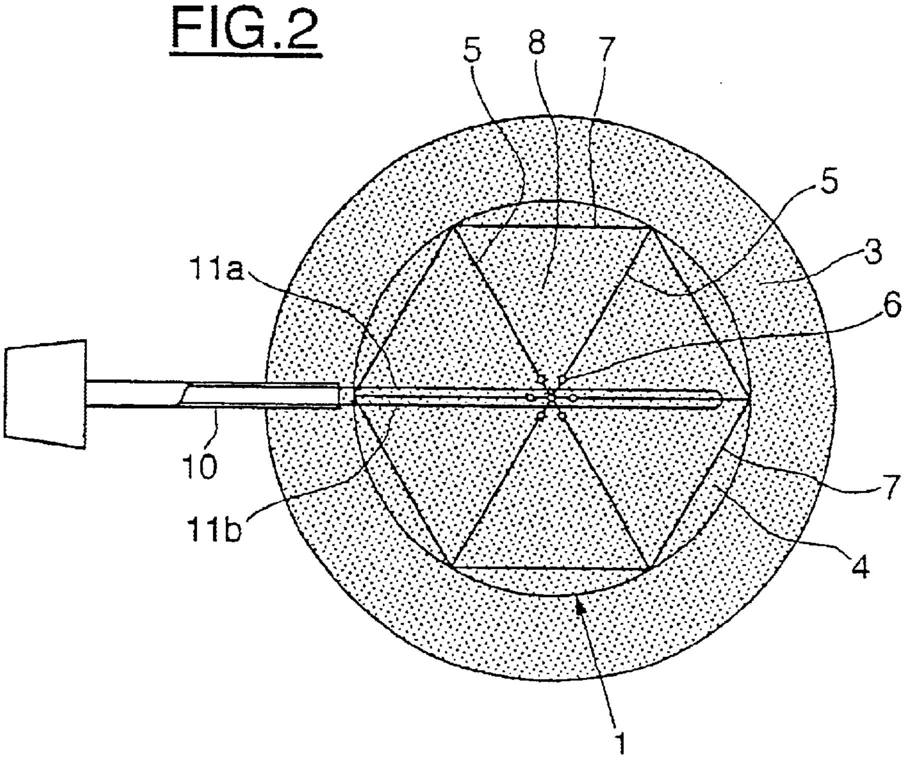
FIG. 2 is a plan view corresponding to FIG. 1.

As can be seen in FIGS. 1*a*, 1*b* and 2, the rupture element 1 has a domed circular shape which is convex on the downstream side and is intended to be fitted to an outlet orifice (not shown) of an enclosure containing a dielectric fluid. The rupture element 1 comprises a retention part 4 in the form of a thin metal sheet, for example made of stainless steel, aluminium or aluminium alloy. The retention part 4 is held tight between two flanges 2, 3 in the form of discs. The rupture element 1 comprises, in addition to the retention part 4, a sealing lining 9 arranged on the upstream side, in other words covering the concave side of the retention part. For example, the lining 9 may be based on polytetrafluoroethylene.

The retention part 4 is provided with radial lines 5 dividing it into 6 portions. The radial lines 5 are formed hollowed into a fraction of the thickness of the retention part 4, so that rupture takes place by tearing of the retention part 4 along one of the said lines 5, and without fragmentation in order to prevent fragments of the retention element 1 from being ripped off and carried along by the fluid flowing through the retention element 1 and running the risk of damaging a duct located downstream.

The retention part 4 is provided with through-holes 6 of very small diameter, one of which is located at the centre of the retention part 4 and the others of which are distributed one per line 5 close to the centre. In other words, seven holes 6 are arranged with six forming a hexagon and one at the centre. The holes 6 form tear initiators with even lower strength than the lines 5 and guarantee that tearing starts at the centre of the retention part 4 and propagates outwards. The formation of at least one hole 6 per line 5 ensures that the lines 5 will tear simultaneously, providing the largest possible passage cross section, the holes 6 other than the central hole being arranged at equal distances from the centre. As a variant, a number of lines 5 other than six and/or a plurality of holes 6 per line 5 may be envisaged. The sealing lining 9 is capable of closing off the holes 6.

The burst pressure of the retention element 1 is determined, in particular, by the diameter and position of the holes 6, the depth of the lines 5, and the thickness and composition of the material forming the retention part 4.

As can be seen in FIG. 2, the retention part 4 is provided with grooves 7, each groove 7 being formed on a linear segment joining the intersection of a line 6 and the circular edge of the retention part 4 to the intersection of a line 6 adjacent to the previous one and the circular edge of the retention part 4. However, FIG. 2 is a plan view and the retention part 4 is domed. It will therefore be understood that the grooves 7 follow the curvature of the retention part 4 and would, in side view, be arcs of an ellipse. A groove 7 and two adjacent lines 6 form a triangle 8 which, upon rupture, will become separated from the neighbouring triangles by tearing of the material in the lines 6 and will deform in the downstream direction by folding along the groove 7. The grooves 7 cause the triangles 8 to fold without tearing in order to avoid ripping the said triangles 8 which could damage a downstream duct or impair the flow in the downstream duct, thus increasing the pressure head drop and slowing the depressurization on the upstream side. The pressure head drop due to the retention element 1 after rupture is reduced as the number of lines 5 and grooves 7 increases. The number of lines 5 and grooves 7 also depends on the diameter of the retention element 1.

The flange 3 arranged downstream of the flange 2 is pierced with a radial hole in which a protective tube 10 is arranged. The rupture detector comprises an electrical wire 11 which is fixed to the retention part 4 on the downstream side and is arranged in a loop. The electrical wire 11 extends into the protective tube 10 as far as the connection unit 12. The electrical wire 11 extends over substantially the entire diameter of the retention element 1, with one wire portion 11*a* arranged on one side of a line 5, parallel to the said line 5, and the other wire portion 11*b* arranged radially on the other side of the same line 5, parallel to the said line 5. The distance between the two wire portions 11*a*, 11*b* is small. This distance may be less than the maximum distance between two holes 6, so that the wire 11 passes between the holes 6.

The electrical wire 11 is covered with a protective film 12 which serves both to prevent it from corroding and to adhesively bond it on the downstream face of the retention part 4. The composition of this film 12 will also be chosen in order to avoid modifying the rupture pressure of the rupture element 1. The film 12 may be made of weakened polyamide. Bursting of the rupture element necessarily leads to cutting of the electrical wire 11. This cutting can be detected extremely simply and reliably by interruption to the flow of a current carried by the wire 11, or alternatively by a voltage difference between the two ends of the wire 11.

Figure 3:
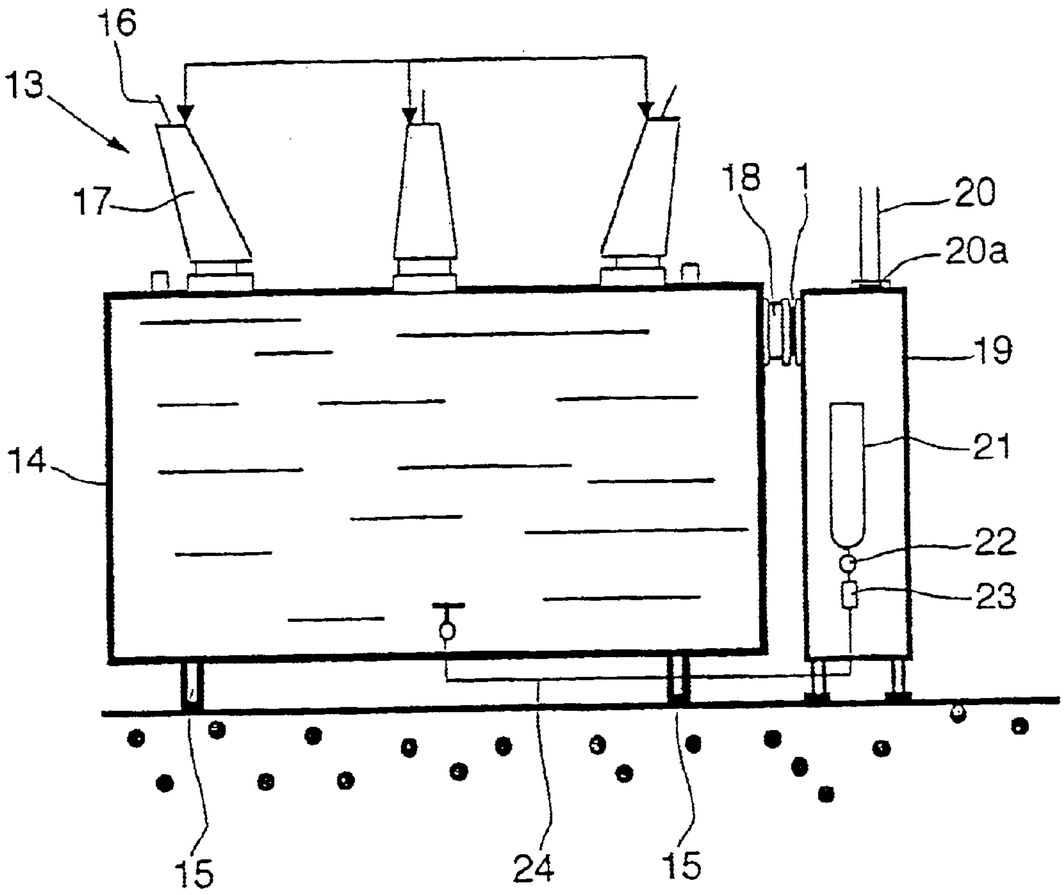
FIG. 3 is an overall view of a transformer equipped with a prevention device according to the invention.

As illustrated in FIG. 3, the transformer 13 comprises a main enclosure 14 resting on the ground by means of legs 15 and is supplied with a electrical energy by wires 16 surrounded by insulators 17. The main enclosure 14 is filled with coolant, for example dielectric oil, and is generally intended to withstand an internal gauge pressure of 1 bar.

The main enclosure 14 is provided with an elastic compensater sleeve 18, downstream of which a rupture element 1 is fitted, the bursting the latter making it possible to detect, without delay, the variation in pressure due to the deflagration caused by the break in the electrical insulation of the transformer. The rupture element 1 is supported by a reservoir 19 intended to collect the oil coming from the main enclosure 14 after the rupture element 1 has burst. The reservoir 19 is equipped with a pipe 20 for discharging gases originating from the oil to the atmosphere. If the transformer is installed in a closed space, the pipeline 20 will deliver to outside the said closed space. The main enclosure 14 is thus depressurized immediately and partially drained into the reservoir 19. The rupture element 1 may be designed to burst at a specific pressure lower than 1 bar, for example between 0.2 and 0.9 bar, preferably between 0.9 and 0.8 bar.

An air isolation valve 20*a* is arranged in the pipeline 20 in order to prevent the entry of oxygen from the air, which could feed the combustion of the gases which may become explosive and that of the oil in the reservoir 19 and in the main enclosure 14.

The transformer 13 is supplied by means of a supply relay (not shown) which comprises supply cut-off means such as circuit breakers intended to protect the transformer 13 and which is provided with tripping sensors.

The main enclosure 14 comprises a means for cooling the fluid by injecting an inert gas such as nitrogen into the bottom of the main enclosure. This cooling makes it possible to reduce the quantity of dangerous gases produced by the decomposition of the fluid and to reduce the proportion of hydrogen in the said quantity of dangerous gases. The inert gas is stored in at least one pressurized bottle 21 provided with a pyrotechnic valve 22, a pressure reducer 23 and a pipe 24 feeding the inert gas to the bottom of the main enclosure 14. The opening of the valve 22 is controlled by a rupture signal coming from the rupture detector integrated with the rupture element 1, coinciding with a signal for triggering one of the electrical protections of the transformer 13. The injection of inert gas causes a slight rise in the level of dielectric fluid in the main enclosure 14 and flow into the reservoir 19.

A protection system of this type is economical, self-contained in relation to the neighbouring plant, is compact and does not require maintenance.

Figure 4:
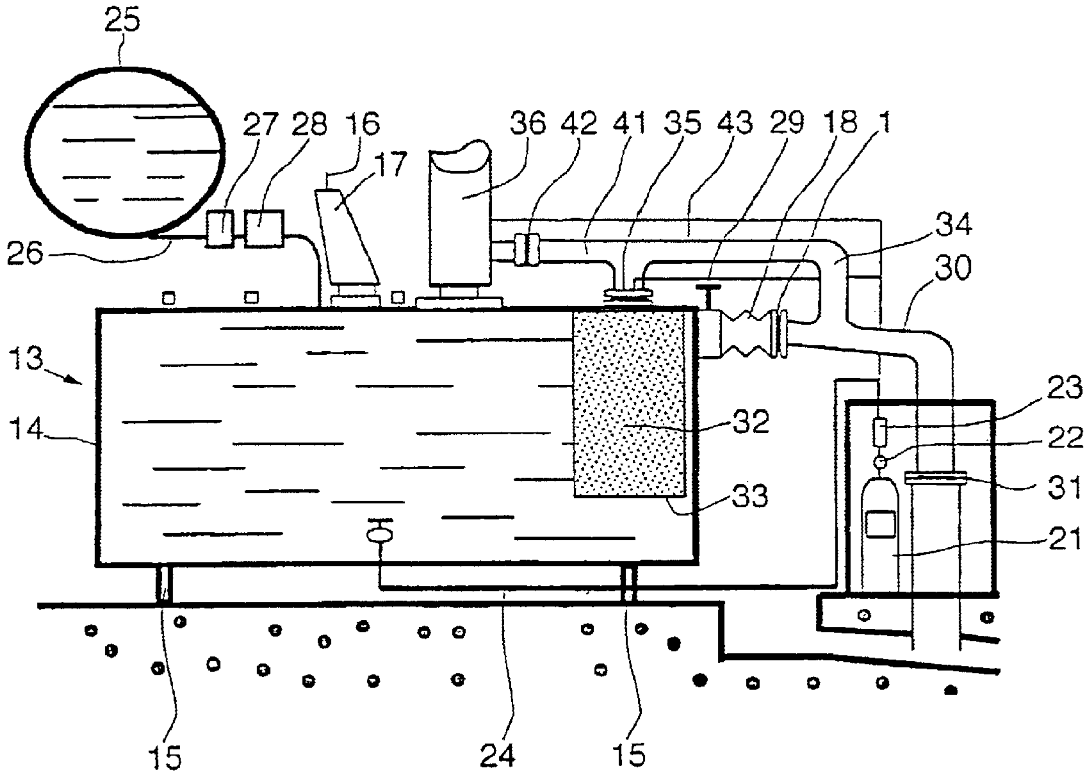
FIG. 4 is an overall view of a transformer equipped with a plurality of prevention devices which are intended to protect the enclosure, the on-load tap changers and feed-throughs according to the invention.

The transformer 13 illustrated in FIG. 4 has a power range higher than that of the one in FIG. 3 and is equipped with one or more on-load tap changers and electrical feed-throughs for high and low voltages.

In order to guarantee a constant coolant level in the main enclosure 14, the transformer 13 is provided with a top-up reservoir 25 in communication with the main enclosure 14 via a duct 26.

The duct 26 is provided with an automatic valve 27 which closes off the duct 26 as soon as it detects rapid movement of the fluid. Thus, in the event of an explosion of the main enclosure 14, the pressure in the duct 26 drops abruptly, which makes the liquid start to flow, this flow being rapidly stopped by the closure of the automatic valve 27. This thus prevents the liquid contained in the top-up reservoir 25 from feeding the fire of the transformer 13.

The main enclosure 14 comprises a sensor detecting the presence of coolant vapour also referred to as a buchholz sensor 28, fitted to a high point of the main enclosure, in general on the duct 26. The deflagration due to a break in electrical insulation rapidly causes the release of vapour of the fluid in the main enclosure 14. A vapour sensor 28 is therefore effective in detecting a break in the electrical insulation.

The transformer 13 comprises a valve 29 arranged between its enclosure 14 and the elastic compensator sleeve 18. The valve 29 is constantly open when the transformer 13 is powered up, and can be closed during maintenance operations carried out with the transformer 13 shut down. Fitted downstream of the rupture element 1, is a depressurization duct 30 provided with an air isolation valve 31. The depressurization duct 30 opens into a sump or a harmless flow.

The transformer 13 may be equipped with one or more on-load tap changers 32 used as interfaces between the said transformer 13 and the electrical network to which it is connected, in order to ensure a constant voltage in spite of the variations in the current delivered to the network. The on-load tap changer 32 is equipped with an enclosure 33 connected via a depressurization duct 34 to the depressurization duct 30. By way of explanation, the on-load tap changer 32 is also cooled by an inflammable coolant. Because of its small volume, explosion of an on-load tap changer 32 is extremely violent and may be accompanied by spraying of jets of burning coolant. The depressurization duct 34 is provided with a rupture element 35 capable of tearing in case of short-circuit, and therefore of overpressure inside the on-load tap changer 32. The rupture element 35 is similar to the one referenced 1 and has suitable dimensions. Explosion of the enclosure 33 of the said on-load tap changer 32 is thus prevented.

Figure 6:
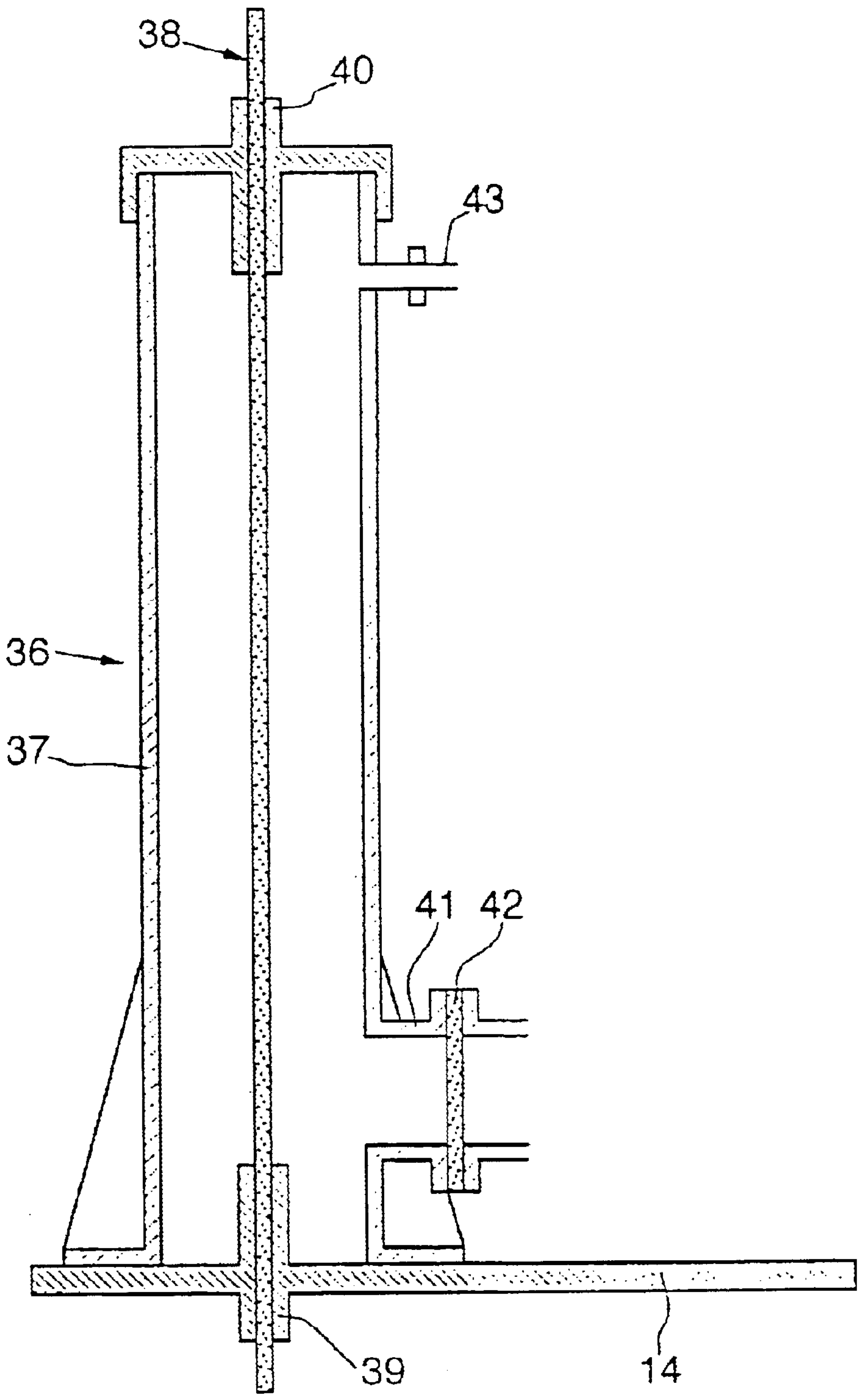
FIG. 6 is a cross-sectional view of a feed-through equipped with a prevention device according to the invention.

The transformer 13 comprises a plurality of electric feed-throughs 36 allowing it to be connected to a high-voltage electrical network. FIG. 6 shows an illustrative embodiment of an electrical feed-through. The electrical feed-through 36 comprises an enclosure or oil box 37 of cylindrical shape with a lower end fitted on the main enclosure 14 and the upper end free. An output rod 38 coming from the main enclosure 14 passes through the oil box 37 from one end to the other. A leaktight electrical insulator 39 is arranged between the output rod 38 and the wall of the main enclosure 14. Similarly, an electrical insulator 40 is arranged between the output rod 38 and the free upper end of the oil box 37, which is almost entirely filled with oil in a normal operating situation.

A duct 41 connects the bottom of the oil box 37 and the depressurization duct 34 of the on-load tap changer 32. A rupture element 42 is arranged in and closes off the duct 41 under normal conditions. The rupture element 42 is similar to the one referenced 1, and has suitable dimensions.

A pipeline 43 for injecting inert gas opens into the top of the oil box 37 and is connected to one or more bottles 21 (FIG. 4).

It has been observed that short-circuits of the electrical feed-throughs are most often due to the insulator 39 which ages or cracks under the effect of vibrations of the main enclosure 14 on which it is fixed. The electric arc due to the short-circuit releases a considerable amount of energy, whence a rise in the temperature of the oil, the release of gas and an abrupt increase in the pressure in the oil box 37. The increase in pressure causes the insulator 39 or the oil box 37 to rupture. In contact with the air, the gases ignite and the oil spreads over the transformer 13. An extensive fire results.

During explosion, the damage to the insulator 39 often creates an oil leak from the main enclosure 14, which feeds the fire and helps it spread to the transformer 13, its accessories and the neighbouring plant.

Conversely, according to the present invention, the rupture element 42 is chosen with a rupture pressure lower than the proof pressure of the oil box 37. The increase in pressure causes the rupture element 42 to burst, whence immediate depressurization of the oil box 37 and flow of oil. Detection of the rupture by virtue of the integrated wire makes it possible to bring about injection of inert gas via the pipeline 43 in order to prevent oxygen from the ambient air from being introduced into the oil box 37 and promoting the flow of oil. The electrical protections of the transformer 13 make it possible to trip the transformer 13 in order to shut it down. Only the damaged electrical feed-through then needs to be repaired, whence a reduction in costs and outage of the transformer 13.

Figure 5:
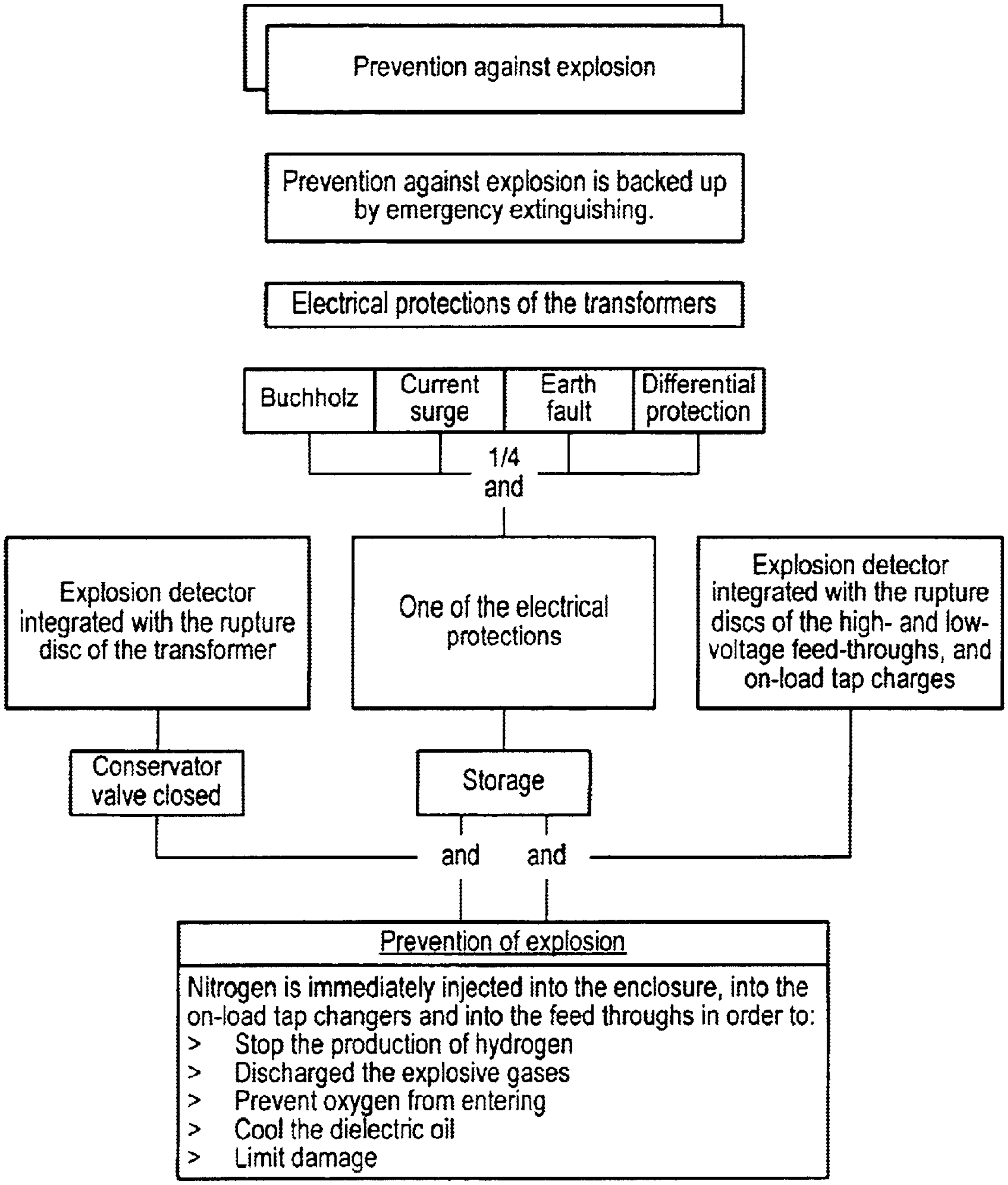
FIG. 5 is a schematic view representing the operational logic of the device represented in FIG. 4, according to the invention.

The transformer 13 also comprises a control module (not shown) connected to each rupture detector of the rupture elements 1, 35 and 42. Any rupture of one of the elements 1, 35 or 42 detected, coinciding with the tripping of the electrical protections of the transformer, will lead to the injection of inert gas into the main enclosure 14, the on-load tap changers 32 and the electrical feed-throughs 36, because a short-circuit in one of these elements often entails damage to the others (FIG. 5). The transformer 13 is moreover shut down just by the electrical protections themselves. As can be seen in FIG. 5, tripping one of the electrical protections of the transformer (Buchholz, current surge detector, earth fault detector, differential protection) and one of the rupture elements causes the injection of inert gas into all the elements containing combustible fluid.

The control module may also be connected to the accessory sensors such as fire detector, vapour sensor 28 (Buchholz) and supply relay tripping cell in order to trigger extinguishing of the fire in the event that the explosion prevention fails.

The invention thus provides a device for prevention against explosion of a transformer which requires few modifications to the elements of the transformer, which detects the insulation breaks extremely rapidly and acts simultaneously so as to limit the consequences resulting therefrom. This makes it possible to prevent explosions of the oil containers and the fires which result therefrom, reducing the damage associated with short-circuits in the transformer as well as the on-load tap changers and the feed-throughs.

What is claimed is:

1. Device for prevention against explosion of an electrical transformer comprising an enclosure filled with combustible coolant, and a decompression element coupled to the enclosure and configured to decompress the enclosure of the transformer during use, wherein the decompression element comprises a rupture element comprising a retention part, the retention part comprising first zones which have a reduced thickness in comparison with the rest of the retention part and are capable of tearing without fragmenting when the rupture element ruptures, and second zones which have a reduced thickness in comparison with the rest of the retention part and are capable of folding without tearing when the rupture element ruptures, the rupture element being capable of breaking when the pressure inside the enclosure exceeds a predetermined ceiling.

2. Device according to claim 1, wherein the rupture element further comprises a sealing component which is arranged on the coolant side of the enclosure and is capable of closing off small-diameter holes formed in the retention part.

3. Device according to claim 2, wherein the sealing component is in the form of a lining on the retention part, the lining being composed of polytetrafluoroethylene.

4. Device according to claim 1, wherein the retention part has a domed shape with convexity on the opposite side to the coolant.

5. Device according to claim 1, wherein the retention part is made of stainless steel, aluminum or aluminum alloy.

6. Device according to claim 1, further comprising a rupture-detection element integrated with the rupture element.

7. Device according to claim 6, wherein the rupture-detection element comprises an electrical wire capable of breaking at the same time as the rupture element, the electrical wire being adhesively bonded on the rupture element.

8. Device according to claim 7, wherein the electrical wire is arranged on the opposite side of the retention part to the coolant, the electrical wire being covered with a protective film.

9. System according to claim 1, wherein the rupture element further comprises a sealing component which is arranged on the coolant side of the enclosure and is capable of closing off small-diameter holes formed in the retention part.

10. System according to claim 9, wherein the sealing component is in the form of a lining on the retention part, the lining being composed of polytetrafluoroethylene.

11. System for prevention against explosion of an electrical transformer comprising an enclosure filled with combustible coolant, the enclosure comprising windings, and an on-load tap changer, wherein decompression elements are coupled to the main enclosure and the on-load tap changer, wherein each of the decompression elements comprise a rupture element comprising a retention part, the retention part comprising first zones which have a reduced thickness in comparison with the rest of the retention part and are capable of tearing without fragmenting when the rupture element ruptures, and second zones which have a reduced thickness in comparison with the rest of the retention part and are capable of folding without tearing when the rupture element ruptures, the rupture element being capable of breaking when the pressure inside the enclosure exceeds a predetermined ceiling.

12. System according to claim 11, further comprising an electrical feed-through wherein an additional decompression element is coupled to the electrical feed-through.

13. System according to claim 11, wherein the retention part has a domed shape with convexity on the opposite side to the coolant.

14. System according to claim 11, wherein the retention part is made of stainless steel, aluminum or aluminum alloy.

15. System according to claim 11, further comprising a rupture-detection element integrated with the rupture element.

16. System according to claim 15, wherein the rupture-detection element comprises an electrical wire capable of breaking at the same time as the rupture element, the electrical wire being adhesively bonded on the rupture element.

17. System according to claim 16, wherein the electrical wire is arranged on the opposite side of the retention part to the coolant, the electrical wire being covered with a protective film.

18. An electrical transformer comprising an enclosure filled with combustible coolant and a device for prevention against explosion, the device for prevention against explosion comprising a decompression element coupled to the enclosure and configured to decompress the enclosure of the transformer during use, wherein the decompression element comprises a rupture element comprising a retention part, the retention part comprising first zones which have a reduced thickness in comparison with the rest of the retention part and are capable of tearing without fragmenting when the rupture element ruptures, and second zones which have a reduced thickness in comparison with the rest of the retention part and are capable of folding without tearing when the rupture element ruptures, the rupture element being capable of breaking when the pressure inside the enclosure exceeds a predetermined ceiling.

* * * * *